(12) United States Patent
Kovie et al.

(10) Patent No.: US 11,541,732 B1
(45) Date of Patent: Jan. 3, 2023

(54) VEHICLE DOOR ASSEMBLY

(71) Applicant: Nissan North America, Inc., Franklin, TN (US)

(72) Inventors: David Kovie, Livonia, MI (US); Mahiuddin Ahmed, Troy, MI (US); Christopher Herrala, Milford, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 0 days.

(21) Appl. No.: 17/473,979

(22) Filed: Sep. 13, 2021

(51) Int. Cl.
*B60J 5/04* (2006.01)
*E05B 77/04* (2014.01)

(52) U.S. Cl.
CPC ......... *B60J 5/0433* (2013.01); *B60J 5/0415* (2013.01); *B60J 5/0434* (2013.01); *B60J 5/0443* (2013.01); *B60J 5/0461* (2013.01); *E05B 77/04* (2013.01)

(58) Field of Classification Search
CPC ...... B60J 5/0433; B60J 5/0423; B60J 5/0415; B60J 5/0443; B60J 5/0461; E05B 77/04
See application file for complete search history.

(56) References Cited

U.S. PATENT DOCUMENTS

| | | | |
|---|---|---|---|
| 9,366,062 B2 * | 6/2016 | Kerr, III | E05B 77/06 |
| 2011/0095546 A1 * | 4/2011 | Russell | B60J 5/0434 |
| | | | 292/216 |
| 2021/0238895 A1 * | 8/2021 | Kovie | E05B 77/04 |

* cited by examiner

*Primary Examiner* — Joseph D. Pape
(74) *Attorney, Agent, or Firm* — Global IP Counselors, LLP

(57) ABSTRACT

A vehicle door assembly includes a door structure, an interior latch handle a panel and an interference member. The interior latch handle is installed to an inboard area of an inner door panel of the door structure. The interior latch handle has a housing and a release lever supported to the housing for pivotal movement. The panel is fixed to the inner door panel. The interference member is fixed to the panel and extends toward the release lever. With the door structure in a non-deformed state the interference member is spaced apart from the release lever. With the door structure in a deformed state in response to an impact event proximate a central area of the door structure, the panel can deformed and moves the interference member toward one end of the release lever preventing movement of the release lever to an door opening orientation.

19 Claims, 9 Drawing Sheets

VEHICLE DOOR ASSEMBLY

BACKGROUND

Technical Field

The present disclosure generally relates to a vehicle body structure. More specifically, the present disclosure relates to a vehicle body structure with a door that includes an interior door handle operably connected to a door latch mechanism, the door having an interference member that is moved into a position that prevents operation of the interior door handle in response to an impact event in which impact force deforms a central area of the door.

Background Information

Vehicle body structures, such as doors are provided with interior door handles that area mechanically connected to door latch mechanisms. In a closed position, one end of a door having an interior door handle and a door latch mechanism is fixed to the vehicle body structure by heavy duty hinges. An opposite end of the door is releasably latched to an adjacent pillar of the vehicle body structure by the door latch mechanism. In response to an impact event where the door of the vehicle is impacted by an impacting force, it is advantageous to keep the door of the vehicle in a closed orientation so that at least the adjacent pillar supports the door reacting to a portion of the impacting force.

SUMMARY

One object of the present disclosure is to prevent a vehicle door from opening during an impact event.

Another object of the present disclosure is to provide a vehicle door structure with an interference member that moves toward an interior door handle during an impact event thereby preventing the interior door handle from operating and prevent opening the door.

In view of the state of the known technology, one aspect of the present disclosure is to provide a vehicle door assembly a door structure, an interior latch handle, a panel and an interference member. The door structure is configured to attach to a body vehicle structure and has an inner door panel. The door structure is movable to and from each of a closed orientation covering a door opening and an open orientation exposing the door opening. The interior latch handle is installed to an inboard area of the inner door panel. The interior latch handle has a housing and a release lever supported to the housing for pivotal movement between an at rest orientation and a door opening orientation. The panel is fixed to an upper edge of the inner door panel. The interference member is fixed to the panel such that the interference member extends toward the release lever of the interior latch handle. The interference member is positioned on the panel such that with the door structure in a non-deformed state, the interference member is spaced apart from the release lever. In response to an impact event proximate a central area of the door structure where the door structure is deformed and the panel is deformed, the deformation of the panel moves the interference member to a location proximate one end of the release lever preventing movement of the release lever to the door opening orientation.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
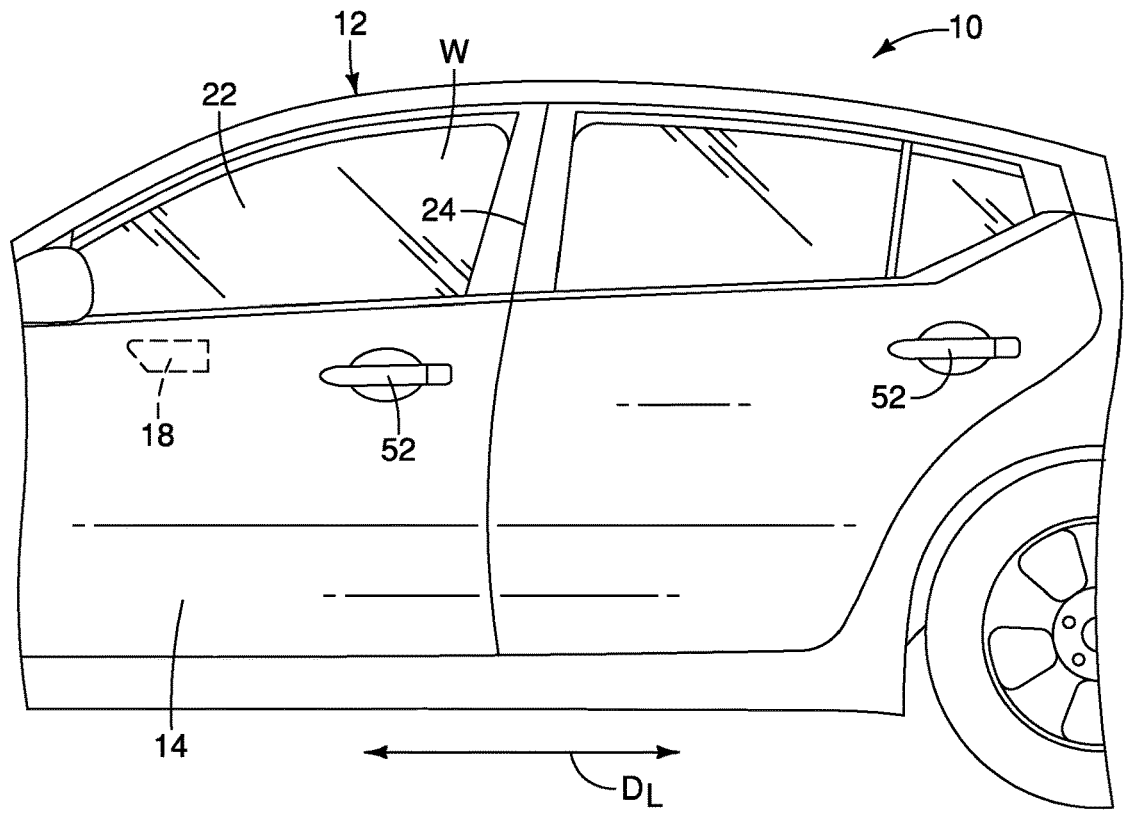
FIG. 1 is a side view of a vehicle that includes a door structure with an interior latch mechanism showing the door structure in a closed orientation in accordance with a first embodiment.
Figure 2:
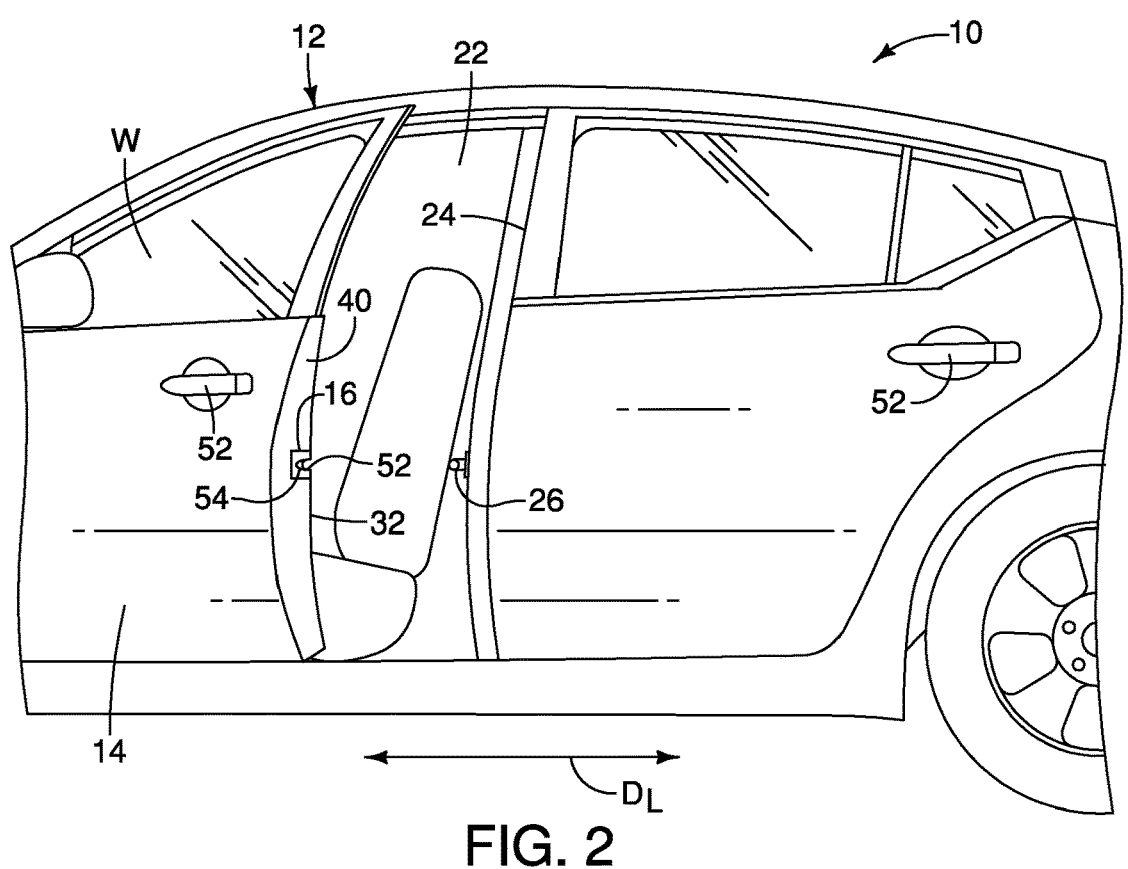
FIG. 2 is another side view of the vehicle showing the door structure in an open orientation in accordance with the first embodiment.

Referring initially to FIGS. 1 and 2, a vehicle 10 is illustrated in accordance with a first embodiment that includes a vehicle body structure 12. The vehicle body structure 12 includes a door 14 with a door latch mechanism 16 and an interior latch handle 18 (FIG. 1).

The vehicle body structure 12 also includes, among other features, a passenger compartment 22 and a door opening 24 that provides access to the passenger compartment 22. The door 14 (also referred to as the door structure 14) is attached to the body vehicle structure 12 such that it is movable to and from each of a closed orientation (FIG. 1) covering the door opening 24 and an open orientation exposing the door opening 24 (FIG. 2). As shown in FIG. 2, the vehicle body structure 12 further includes a latch striker 26 that is attached to, for example, the B-pillar of the vehicle body structure 12.

Figure 3:
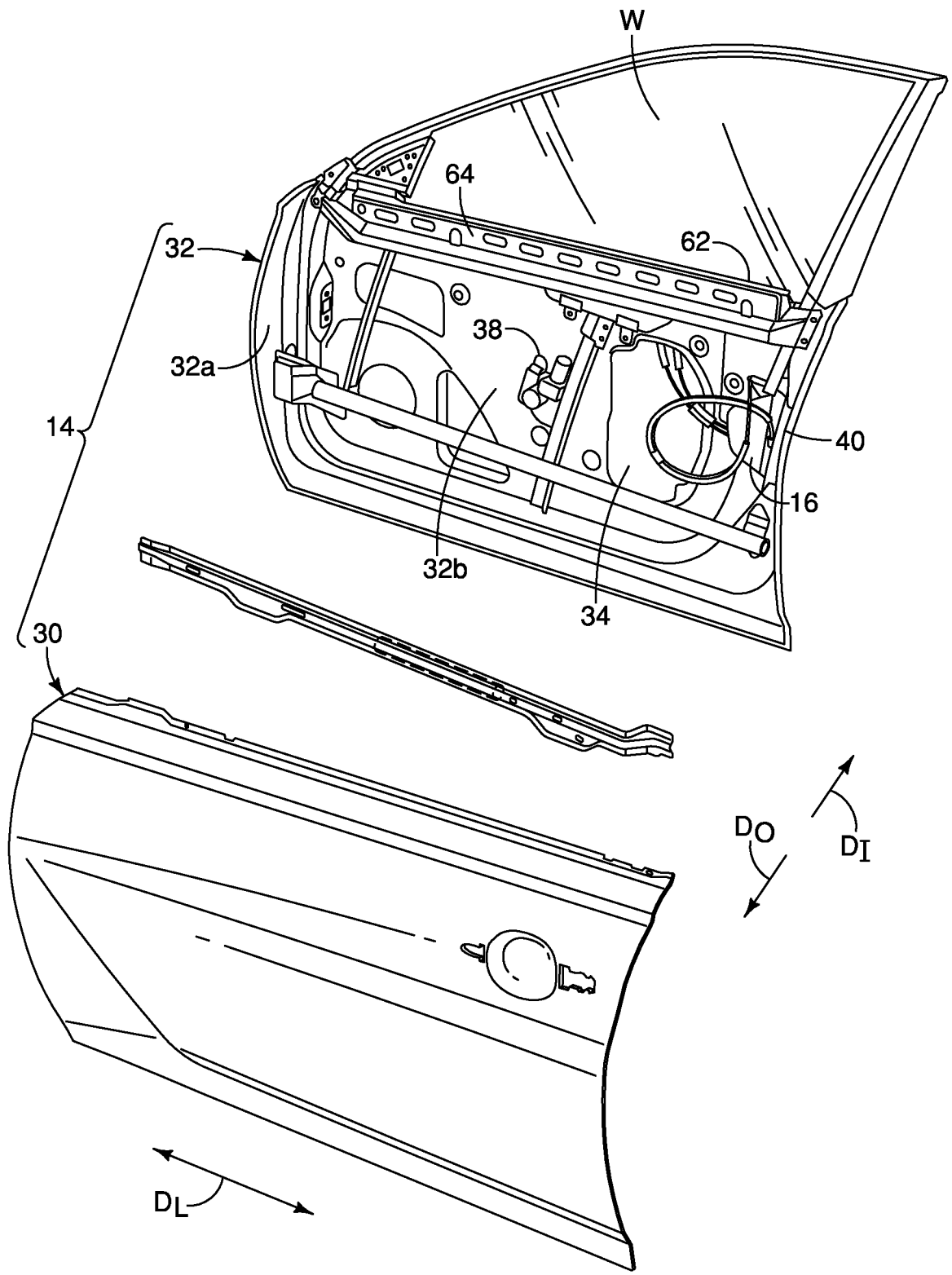
FIG. 3 is an exploded perspective view of the door structure showing an outer panel, an inner panel and the interior latch mechanism in accordance with the first embodiment.
Figure 4:
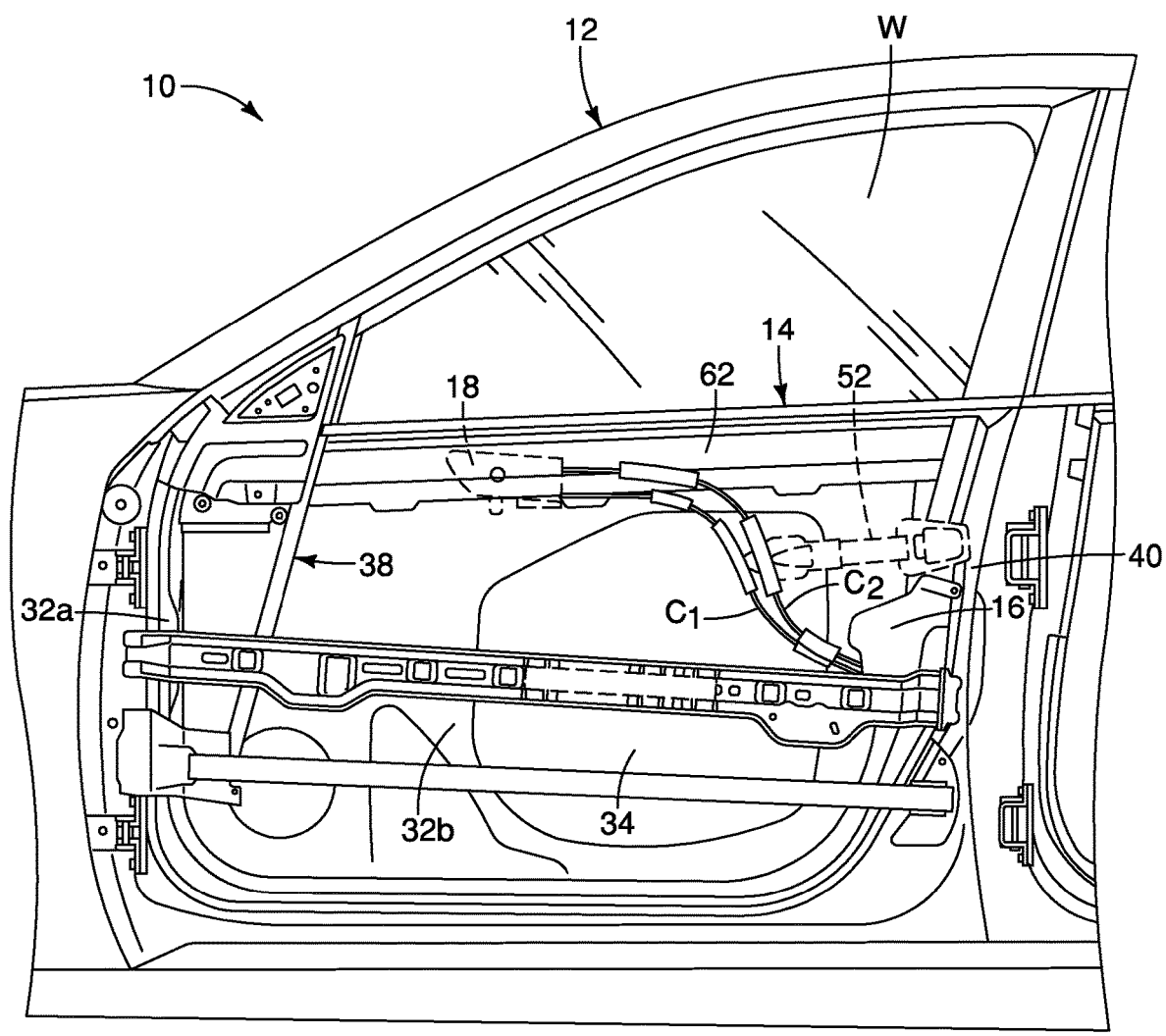
FIG. 4 is another side view of the vehicle with an outer panel of the door structure removed showing a latch mechanism and the reinforcement member of the door in accordance with the first embodiment.
Figure 5:
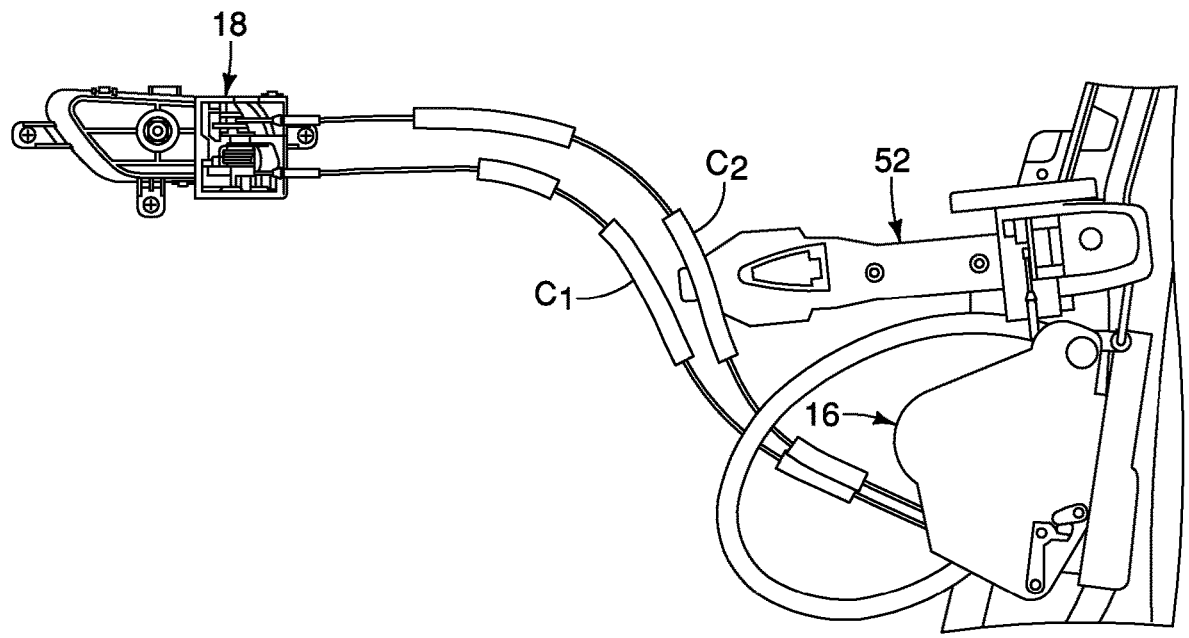
FIG. 5 is a side view of the latch mechanism and the interior door handle removed from the door in accordance with the first embodiment.

The vehicle body structure 12 defines a vehicle longitudinal direction DL, as shown in FIGS. 1, 2 and 4. The vehicle body structure 12 also defines vehicle inboard direction $D_1$ and vehicle outboard directions Do as shown in FIG. 3. The vehicle inboard direction $D_1$ and the vehicle outboard directions Do are defined relative to a lengthwise center line (not shown) of the vehicle 10 and are generally perpendicular to the vehicle longitudinal direction DL.

Figure 11:
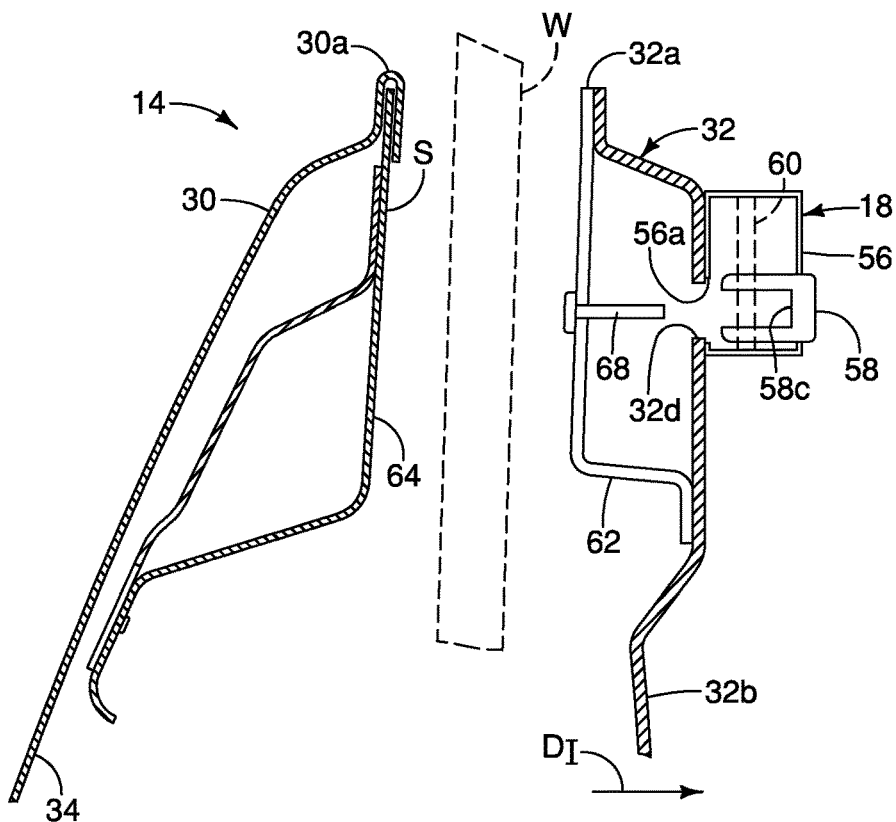
FIG. 11 is a cross-sectional view of an upper area of the door showing an outer door panel, an inner door panel and the interior door handle, the inner door panel having a window slot defining panel that includes an interference member, the door being in a non-impacted state in accordance with the first embodiment.

The door structure 14 includes an outer door panel 30 and an inner door panel 32. The outer door panel 30 is fixedly attached to the inner door panel 32 in a conventional manner (for example, welding techniques) defining a hollow interior 34 therebetween, as shown in FIGS. 3, 4 and 11.

The inner door panel 32 has a forward section 32a, a main panel portion 32b and a rearward section 40. The forward section 32a extends vertically along a forward end of the main panel portion 32a. The rearward section 40 extends along a rearward end of the main panel portion 32b with the hollow interior 34 of the door structure 14 being at least partially defined along the main panel portion 32b between the forward section 32a and the rearward section 32b.

A window regulator mechanism 38 is installed to the inner door panel 32 in a conventional manner such that a window W is movable from a lowered position (not shown) within the hollow interior 34 and a raised position (FIGS. 1-4) by the window regulator mechanism 38.

The door structure 14 further defines a window receiving slot S (FIGS. 11 and 12) between respective upper ends an upper edge 30a of the outer door panel 30 and an upper edge 32c of the inner door panel 32.

A description of the door latch mechanism 16 (also referred to as the latch mechanism 16) is provided now with specific reference to FIGS. 2-5. The latch mechanism 16 is installed to a rearward area 40 of the inner door panel 32. The latch mechanism 16 is configured such that in a latching orientation, the latch mechanism 16 retains the door structure 14 in the closed orientation and in a release orientation the door structure 14 can move to the open orientation. As shown in FIG. 2, the latch mechanism 16 includes a slot 52 and a latch catch 54 that is partially visible in the slot 52. The latch catch 54 is configured to lock on to the striker 26 when the door 14 is in the closed orientation and release the striker 26 when the latch mechanism 16 operated to release the latch catch 54 from the striker 26 allowing the door 14 to be moved to the open orientation.

The internal operating mechanism (not shown) of the latch mechanism 16 includes conventional mechanical components that are well known in the art. Therefore, further description of the latch mechanism 16 is omitted for the sake of brevity.

As shown in FIG. 4, the interior latch handle 18 is operably connected to the latch mechanism 16 via cables $C_1$ and $C_2$ in a conventional manner. The cables $C_1$ and $C_2$ are located within the hollow interior 34 of the door 14. An exterior latch handle 52 is installed to the outer door panel 30 in a conventional manner and is also operably connected to the latch mechanism 16 via a cable in a conventional manner.

Figure 6:
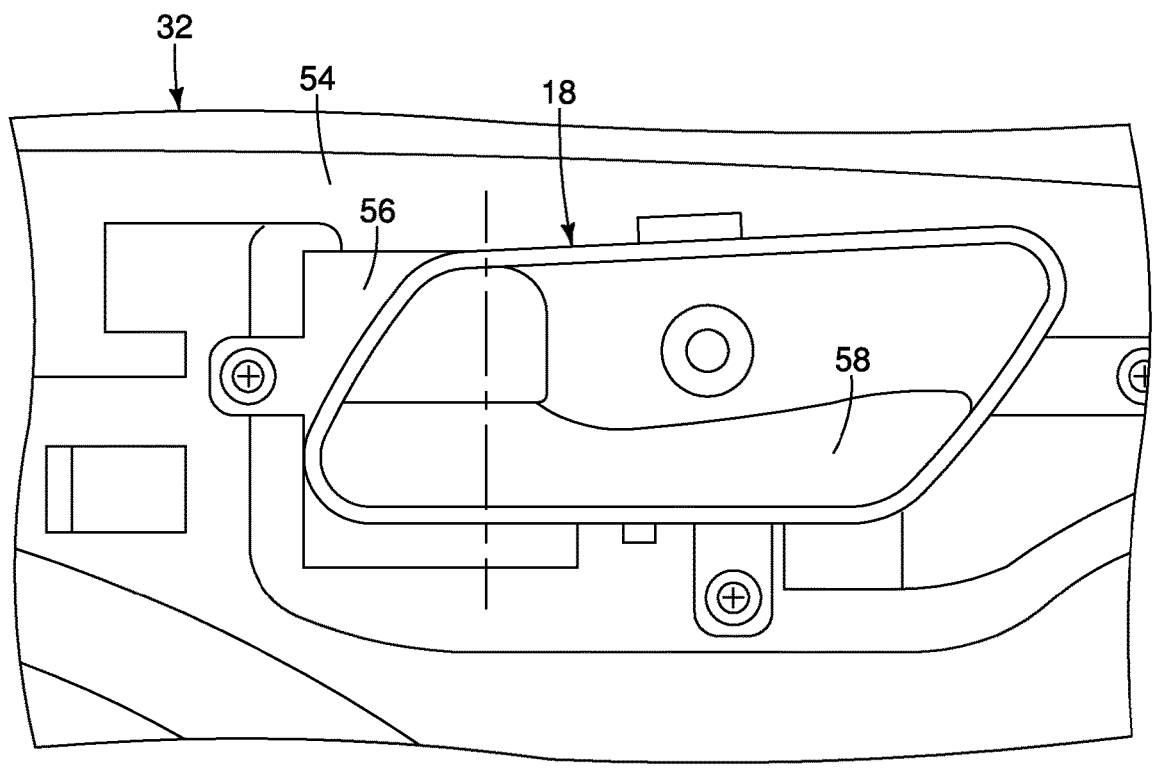
FIG. 6 is a side view of an upper portion of the door showing the interior door handle attached thereto in accordance with the first embodiment.

As shown in FIG. 6, the interior latch handle 18 is installed to an inboard area 54 of the inner door panel 32. The interior latch handle 18 has a housing 56 and a release lever 58 supported to the housing 56 for pivotal movement about a pivot pin 60 between an at rest orientation shown in FIG. 7 and a door opening orientation shown in FIG. 8.

Figure 7:
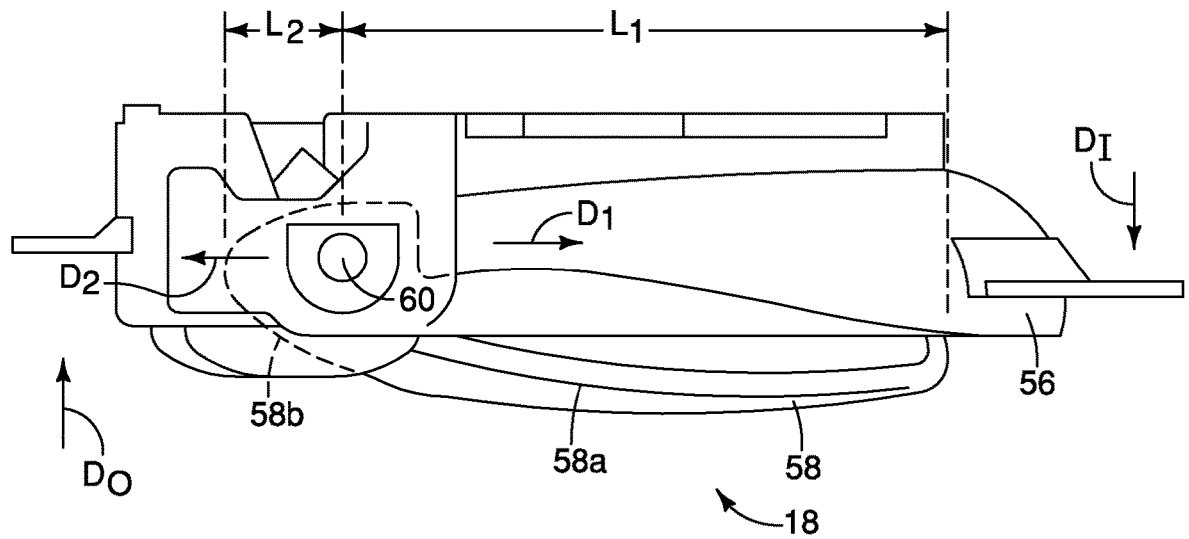
FIG. 7 is a top view of the interior door handle removed from the door showing a handle in an at rest orientation (a door latched orientation) in accordance with the first embodiment.
Figure 8:
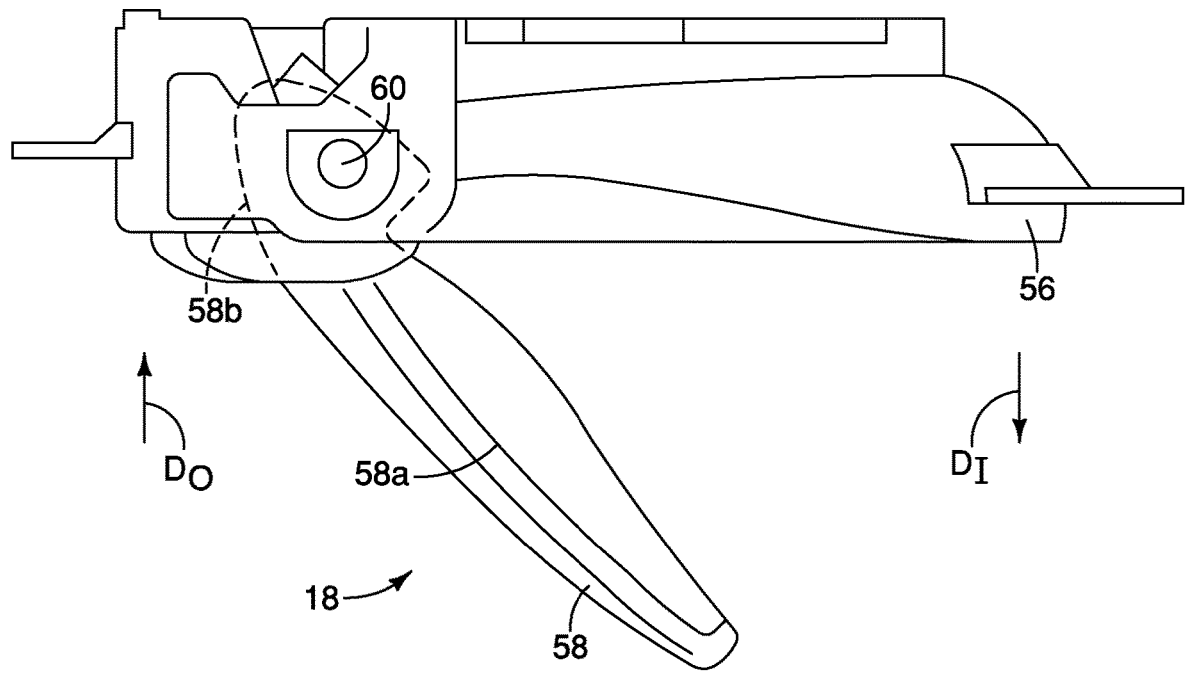
FIG. 8 is another top view of the interior door handle similar to FIG. 7 showing the handle in a door opening orientation in accordance with the first embodiment.

The release lever 58 is operably connected to the latch mechanism 16 via the cables $C_1$ and $C_2$ such that when the release lever 58 is moved to the door opening orientation shown in FIG. 8, the latch mechanism 16 releases the door structure 14 such that the door structure 14 can move to the open orientation. The release lever 58 is biased to return to the at rest orientation (FIG. 7) by a spring (not shown) such that if the door is moved to the closed orientation, the latch mechanism 16 can retain and lock the door structure 14 in the closed orientation.

As shown in FIGS. 7 and 8, the release lever 58 is pivotal about the pivot pin 60. The release lever 58 has a handle portion 58a extending in a first direction $D_1$ away from the pivot pin 60 and an end portion 58b that extends in a second direction $D_2$ away from the pivot pin 60. In response to the handle portion 58a being pulled in the inboard direction $D_1$ the end portion 58b moves in the outboard direction Do. The handle portion 58a has a first overall length $L_1$ measured from the pivot pin 60 and the end portion 58b has a second overall length $L_2$ measured from the pivot pin 60 with the first overall length $L_1$ being more than twice the second overall length $L_2$.

Figure 9:
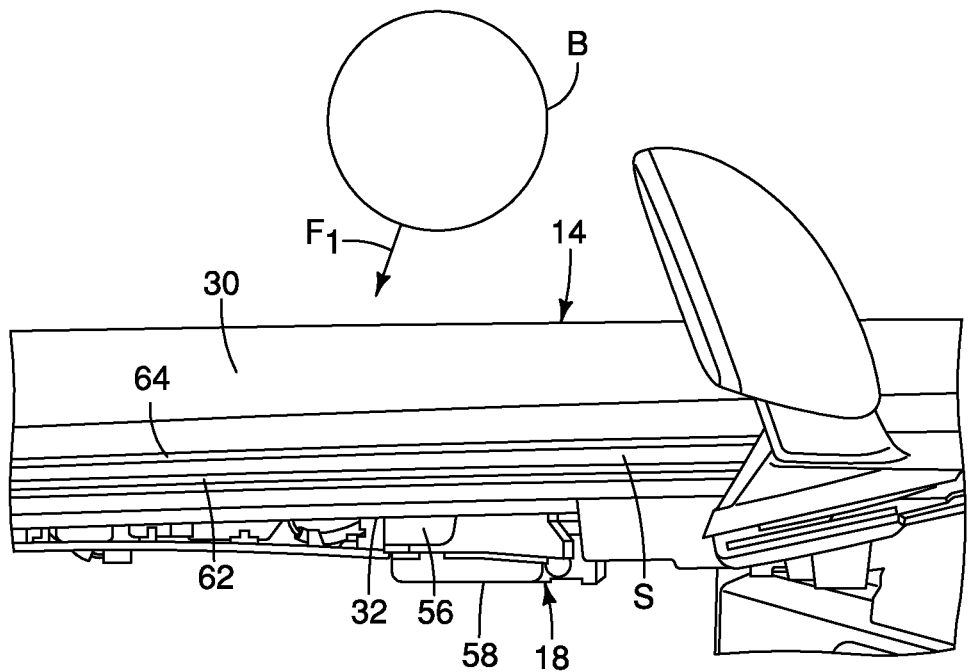
FIG. 9 is a top view of the door showing the door in a non-impacted state prior to an impact event in accordance with the first embodiment.
Figure 10:
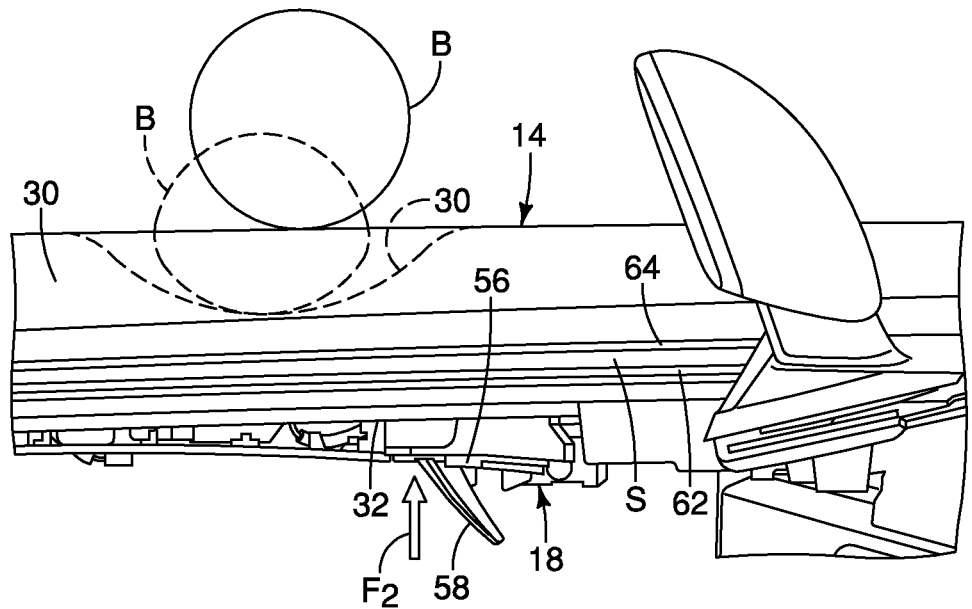
FIG. 10 is another top view of the door showing the door during an impact event with a pole shaped barrier where impact energy causes the door handle to move to the door opening orientation in accordance with the first embodiment.

As shown in FIGS. 9 and 10, in certain circumstance, a barrier B approaching the door 14 can impact the door 14 during an impact event. During such an impact event, the barrier B can cause the outer door 30 to deform (dashed lines) absorbing a portion of the impact event. The impact event can cause the release lever 58 to move from the at rest orientation (door close orientation) shown in FIG. 9 to the door opening orientation shown in FIG. 10. During such an impact event, it is desirable to have the door 14 remain in the closed orientation so that a portion of the force of the impact event is transmitted through the latch mechanism 16 to the B-pillar and other portions of the vehicle body structure 12. Consequently, it is desirable to have the release lever 58 to remain in the at rest orientation so that the door 14 can remain shut. In one such circumstance, as shown in FIG. 10, the barrier B can apply a force Fi to the outer panel 30 of the door 14. If an object or structure within the passenger compartment 22 contacts the end portion 58b of the release lever 58, the movement of the release lever 58 can cause the door 14 to open.

As shown in FIG. 11, the inner door panel 32 includes a panel 62 that is fixedly attached thereto by, for example, any of a variety of welding techniques. The panel 62 extends from a forward area of the inner door panel 32 to a rearward area of the inner door panel 32. The panel 62 is basically a stiffening member. The outer door panel 30 similarly includes another panel 64 (another stiffening member) that extends from a forward area of the outer door panel 30 to a rearward area of the outer door panel 30 and is welded thereto. The panel 62 and the panel 64, respectively, define the inboard side and outboard side of the slot S.

Figure 12:
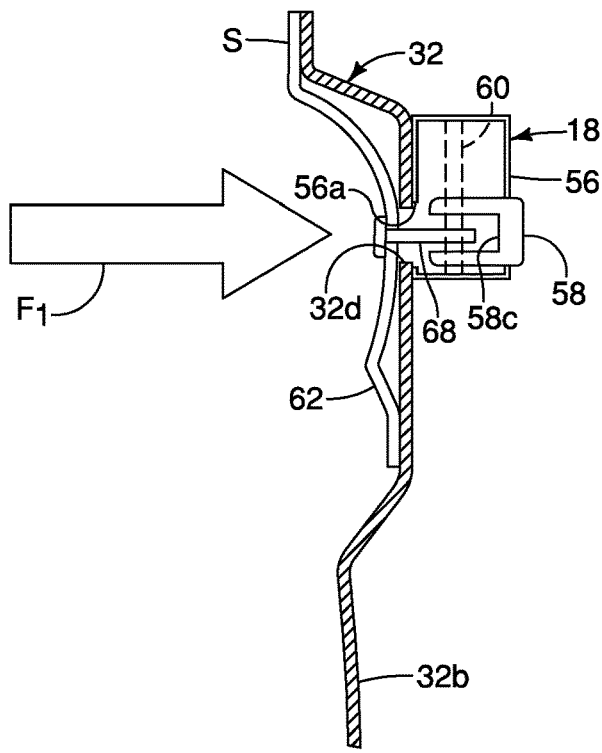
FIG. 12 is another cross-sectional view of the upper area of the door showing the inner door panel, the interior door handle, the panel and the interference member, the panel being deformed during an impact event moving the interference member into a portion of the interior door handle preventing the interior door handle from moving to the door opening orientation in accordance with the first embodiment.
Figure 13:
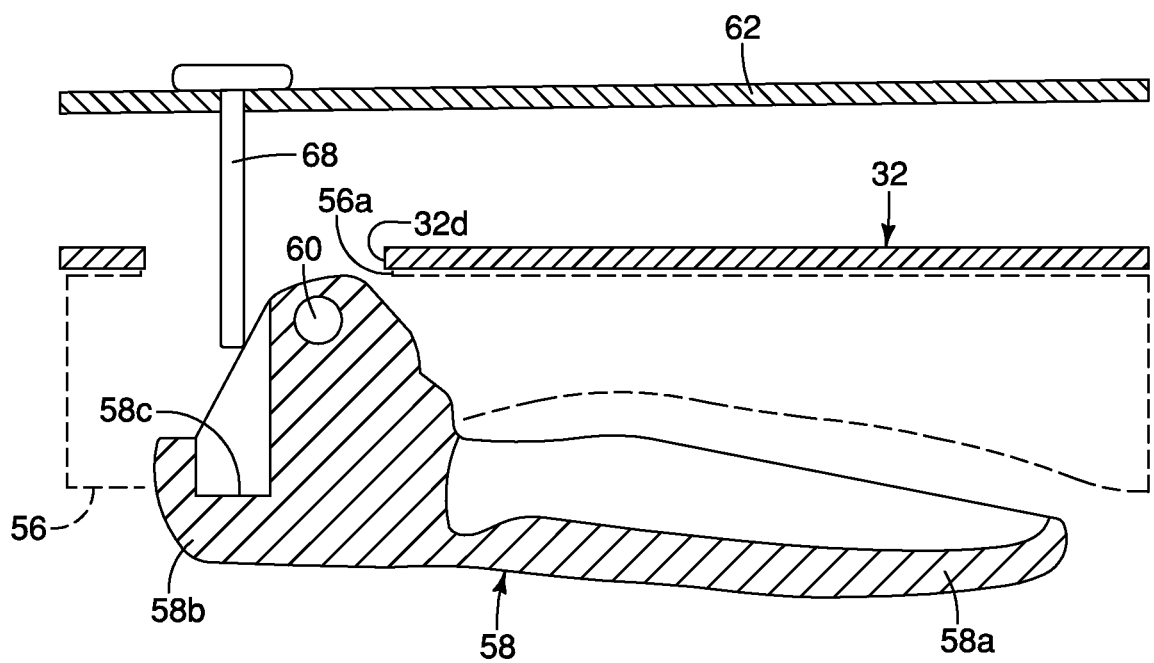
FIG. 13 is a cross-sectional top view of the door showing the inner door panel, the panel, the interference member and the interior door handle, in orientations corresponding to those shown in FIG. 11 with the door in the non-impacted state in accordance with the first embodiment.
Figure 14:
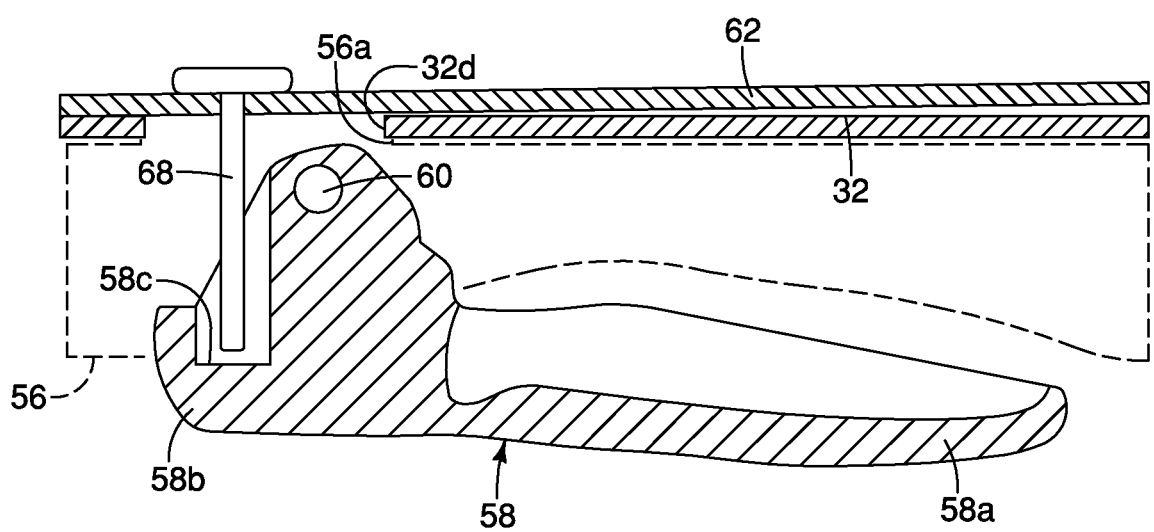
FIG. 14 is another cross-sectional top view of the door showing the inner door panel, the panel, the interference member and the interior door handle in orientations corresponding to those shown in FIG. 12 with the panel of the door deformed during an impact event with the interference member moved into the portion of the interior door handle preventing the interior door handle from moving to the door opening orientation in accordance with the first embodiment.

As shown in FIGS. 11 and 12, the panel 62 of the inner door panel 32 includes an interference member 68 that extends from the panel 62 in the inboard direction $D_1$ toward the interior latch handle 18. The interference member 68 is fixed to the panel 62 by, for example, any of a variety of welding techniques, or can be pressed into an opening (not shown) of the panel 62. The interference member 68 is positioned on the panel 62 such that with the door structure 14 in a non-deformed state the interference member 68 is spaced apart from the release lever 58, as shown in FIGS. 11 and 13. With the door structure 14 in a deformed state in response to an impact event proximate a central area of the door structure 14, the panel 62 can also be deformed and moved such that the interference member 68 is also moved to a location proximate one end of the release lever 58 preventing movement of the release lever 58 to the door opening orientation.

As shown in FIGS. 11-14, the end portion 58b of the release lever 58 is provided with a pocket or concaved area 58c. In response to an impact event where the panel 62 is deformed and moved, the interference member 68 is moved through an opening 32d of the inner door panel 32 and through an opening 56a of the housing 56 of the interior latch handle 18. With the interference member 68 positioned within the concaved area 58c, movement of the release lever 58 is limited thereby preventing the release lever 58 from operating the latch mechanism 16 thereby preventing the release lever 58 from opening of the door 14.

In the first embodiment, the interference member 68 is an elongated rod or pin that is preferably made of a strong, bend resistant metal material.

Second Embodiment

Figure 15:
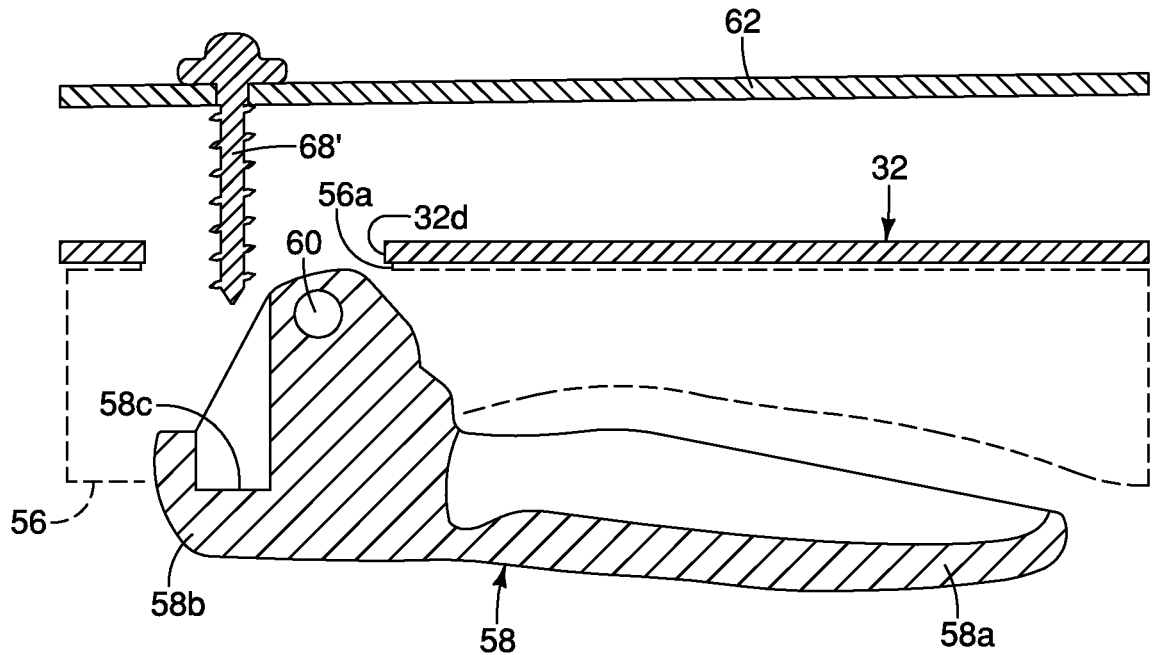
FIG. 15 is a cross-sectional top view of the door showing the inner door panel, the panel, an interference member and the interior door handle, in orientations corresponding to those shown in FIG. 11 with the door in the non-impacted state in accordance with a second embodiment.
Figure 16:
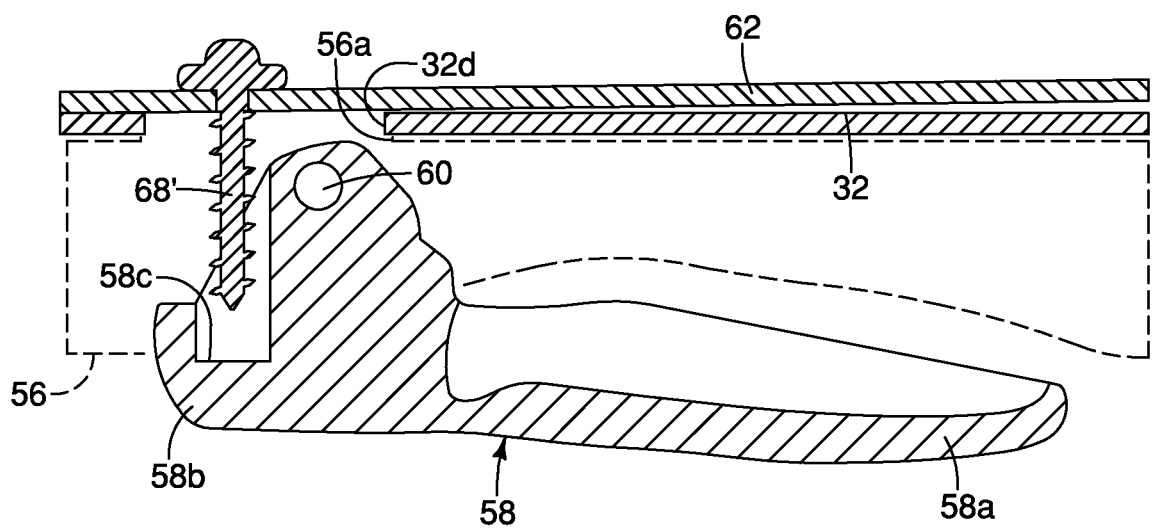
FIG. 16 is another cross-sectional top view of the door showing the inner door panel, the panel, the interference member and the interior door handle in orientations corresponding to those shown in FIG. 12 with the panel of the door deformed during an impact event with the interference member moved into the portion of the interior door handle preventing the interior door handle from moving to the door opening orientation in accordance with the second embodiment.

Referring now to FIGS. 15 and 16, an interior latch handle 18 and an interference member 68' in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. The parts of the second embodiment that differ from the parts of the first embodiment will be indicated with a single prime (').

The panel 62 of the inner door panel 32 is identical to the panel 62 described above with reference to the first embodiment. The panel 62 is provided with the interference member 68' in accordance the second embodiment. The interference member 68' is fixedly attached to the panel 62 via mechanical threads of the interference member 68' and extends in an inboard direction from the panel 62. In the non-impacted state, the interference member 68' is spaced apart from the end portion 58b of the release handle 58, as shown in FIG. 15. During an impact event, where the panel 62 is moved in the inboard direction, the interference member 68' is moved through the opening 32d and the opening 56a and into the pocket or concaved area 58c of the end portion 58b of the release handle 58. Hence, the interference member 68' prevents operation of the release handle 58 during an impact event.

As shown in FIGS. 15 and 16, the interference member 68' is an elongated mechanical fastener with threads such that the interference member 68' can be threaded directly into an opening of the panel 62.

The various vehicle elements and components shown in the drawings but not described above are conventional components that are well known in the art. Since such elements and components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle door assembly. Accordingly, these terms, as utilized to describe the present invention should be interpreted relative to a vehicle equipped with the vehicle door assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle door assembly, comprising:
   a door structure configured to attach to a body vehicle structure and having an inner door panel, the door structure being movable to and from each of a closed orientation covering the door opening and an open orientation exposing the door opening;
   an interior latch handle installed to an inboard area of the inner door panel, the interior latch handle having a housing and a release lever supported to the housing for pivotal movement between an at rest orientation and a door opening orientation; and
   a panel fixed to an upper edge of the inner door panel and having an interference member fixed thereto that extends toward the release lever, the interference member being positioned on the panel such that with the door structure in a non-deformed state the interference member is spaced apart from the release lever, and, with the door structure in a deformed state in response to an impact event proximate a central area of the door structure, the panel is deformed and moves the interference member to a location proximate one end of the release lever preventing movement of the release lever to the door opening orientation.

2. The vehicle door assembly according to claim 1, wherein
   the interference member is an elongated pin attached to the panel extending in an inboard direction from the panel.

3. The vehicle door assembly according to claim 1, wherein
   the interference member is an elongated mechanical fastener attached to the panel extending in an inboard direction from the panel.

4. The vehicle door assembly according to claim 1, wherein
   the housing of the interior latch handle includes an opening aligned with the interference member.

5. The vehicle door assembly according to claim 4, wherein
   the housing includes a pivot pin with the release lever being pivotal about the pivot pin, the release lever having a handle portion extending in a first direction away from the pivot pin and an end portion extending in a second direction away from the pivot pin and the handle portion such that in response to the handle portion being pulled in an inboard direction the end portion moves in an outboard direction.

6. The vehicle door assembly according to claim 5, wherein
   in response to the panel being deformed in an impact event, the interference member is moved through the opening in the housing adjacent to the end portion of the release lever such that the handle portion is prevented from moving in the inboard direction.

7. The vehicle door assembly according to claim 6, wherein
   the handle portion has a first overall length measured from the pivot pin and the end portion has a second overall length measured from the pivot pin with the first overall length being more than twice the second overall length.

8. The vehicle door assembly according to claim 1, wherein
   the panel is an elongated stiffening member fixedly attached to an upper edge of the inner door panel, the stiffening member defining an inboard edge of a window receiving slot of the door structure.

9. The vehicle door assembly according to claim 8, wherein
   the stiffening member is welded to the inner door panel.

10. The vehicle door assembly according to claim 9, wherein
    the interference member is an elongated pin attached to the panel extending in an inboard direction from the panel.

11. The vehicle door assembly according to claim 9, wherein
    the interference member is an elongated mechanical fastener attached to the panel extending in an inboard direction from the panel.

12. The vehicle door assembly according to claim 1, wherein
    the inner door panel has a main panel portion, a forward section extending vertically along a forward end of the main panel portion and a rearward section extending along a rearward end of the main panel portion with a hollow interior of the door structure being at least partially defined along the main panel portion between the forward section and the rearward section.

13. The vehicle door assembly according to claim 12, wherein
    the panel is an elongated stiffening member fixedly attached to an upper edge of the inner door panel, the stiffening member defining an inboard edge of a window receiving slot of the door structure.

14. The vehicle door assembly according to claim 13, further comprising
    a window regulator assembly having positioning mechanism and window tracks, the positioning mechanism being installed to the inner door panel within the hollow space, with the window tracks extending from the positioning mechanism upward through the window receiving slot to an area above an upper edge of the inner door panel.

15. The vehicle door assembly according to claim 14, wherein
    the interference member is an elongated pin attached to the panel extending in an inboard direction from the panel.

16. The vehicle door assembly according to claim 14, wherein
    the interference member is an elongated mechanical fastener attached to the panel extending in an inboard direction from the panel.

17. The vehicle door assembly according to claim 1, further comprising
    an outer door panel fixedly attached to the inner door panel defining a hollow interior therebetween and a window receiving slot between an upper edge of the inner door panel and an upper edge of the outer door panel.

18. The vehicle door assembly according to claim 17, wherein
    the panel is an elongated stiffening member fixedly attached to an upper edge of the inner door panel, the stiffening member defining an inboard edge of the window receiving slot of the door structure.

19. The vehicle door assembly according to claim 1, further comprising
  a latch mechanism installed to a rearward area of the inner door panel, the latch mechanism being configured such that in a latching orientation the latch mechanism retains the door structure in the closed orientation and in a release orientation the door structure can move to the open orientation, and
  the release lever being operably connected to the latch mechanism such that with the release lever being moved to the door opening orientation the latch mechanism releases the door structure such that the door structure can move to the open orientation.

* * * * *